US011827210B2

(12) United States Patent
Hiratsuka et al.

(10) Patent No.: US 11,827,210 B2
(45) Date of Patent: Nov. 28, 2023

(54) SETTING CHANGE ASSIST APPARATUS

(71) Applicant: TOYOTA JIDOSHA KABUSHIKI KAISHA, Toyota (JP)

(72) Inventors: Yuko Hiratsuka, Toyota (JP); Masaru Kawakami, Toyota (JP); Kazuma Tanaka, Toyota (JP); Sawa Higuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 16/941,695

(22) Filed: Jul. 29, 2020

(65) Prior Publication Data

US 2021/0114584 A1 Apr. 22, 2021

(30) Foreign Application Priority Data

Oct. 18, 2019 (JP) .................................. 2019-190651

(51) Int. Cl.
*B60W 30/00* (2006.01)
*B60W 40/08* (2012.01)
*B60W 50/14* (2020.01)

(52) U.S. Cl.
CPC ............ *B60W 30/00* (2013.01); *B60W 40/08* (2013.01); *B60W 50/14* (2013.01); *B60W 2040/0809* (2013.01)

(58) Field of Classification Search
CPC ...... B60W 30/00; B60W 40/08; B60W 50/14; B60W 2040/0809
See application file for complete search history.

(56) References Cited

U.S. PATENT DOCUMENTS

| 8,073,681 | B2 * | 12/2011 | Baldwin ................. G10L 25/51 |
| | | | 704/9 |
| 9,193,315 | B2 * | 11/2015 | Bohrer ................. G06F 3/04842 |
| 9,283,844 | B2 * | 3/2016 | Franganillo ............ B60W 10/02 |
| 2006/0025918 | A1 | 2/2006 | Saeki |
| 2009/0168976 | A1 | 7/2009 | Nakazawa et al. |
| 2017/0174080 | A1 | 6/2017 | Ho et al. |
| 2018/0118223 | A1 * | 5/2018 | Mori ..................... B60W 40/04 |

(Continued)

FOREIGN PATENT DOCUMENTS

| CN | 106379310 A | * | 2/2017 | .......... B60W 30/162 |
| JP | 2006315491 A | | 11/2006 | |

(Continued)

OTHER PUBLICATIONS

Machine translation of CN-106379310-A (Year: 2017).*
Machine translation of JP2014000882 (Year: 2014).*

*Primary Examiner* — Jeff A Burke
*Assistant Examiner* — Mohamad O El Sayah
(74) *Attorney, Agent, or Firm* — Dickinson Wright, PLLC

(57) ABSTRACT

Provided is a setting change assist apparatus for a vehicle configured to: determine whether a setting change request for changing a setting state of driving support control is issued; when determining that the setting change request is issued, notify a driver of confirmation information including information on a content of the setting change request and information on a predetermined approval operation with respect to the setting change request; and change the setting state of the driving support control in accordance with the setting change request when the driver performs the approval operation.

3 Claims, 7 Drawing Sheets

(56) References Cited

U.S. PATENT DOCUMENTS

| | | | |
|---|---|---|---|
| 2019/0126942 A1* | 5/2019 | Goto | B60W 10/20 |
| 2019/0138003 A1 | 5/2019 | Ming et al. | |
| 2019/0204827 A1* | 7/2019 | Bhalla | B60W 50/16 |
| 2020/0047772 A1* | 2/2020 | Yasue | B60W 30/12 |

FOREIGN PATENT DOCUMENTS

| | | |
|---|---|---|
| JP | 4172434 B2 | 8/2008 |
| JP | 2012063537 A | 3/2012 |
| JP | 2014000882 A | 1/2014 |
| JP | 2014148293 A | 8/2014 |
| JP | 2017-117117 A | 6/2017 |
| JP | 2019-526480 A | 9/2019 |
| WO | 2007091462 A1 | 8/2007 |

* cited by examiner

FIG.2

| | 200 |
|---|---|
| SET OF WORDS RELATED TO ACC | "ACC", "ADAPTIVE CRUISE CONTROL", "CRUISE CONTROL", ... |
| SET OF WORDS RELATED TO ON STATE | "TURN ON", "START", ... |
| SET OF WORDS RELATED TO OFF STATE | "CANCEL", "STOP", ... |
| SET OF WORDS RELATED TO TARGET SPEED | "TARGET SPEED", "SET SPEED", "TARGET VEHICLE SPEED", "SPEED", "VEHICLE SPEED", ... |

FIG.3

| TYPE OF SETTING CHANGE REQUEST | APPROVAL OPERATION |
|---|---|
| ACC-ON REQUEST | PRESS OPERATION OF MAIN SWITCH |
| ACC-OFF REQUEST | PRESS OPERATION OF CANCELLATION SWITCH |
| SPEED INCREASING REQUEST | LONG PRESS OPERATION OF SPEED INCREASING SWITCH |
| SPEED DECREASING REQUEST | LONG PRESS OPERATION OF SPEED DECREASING SWITCH |

FIG.4

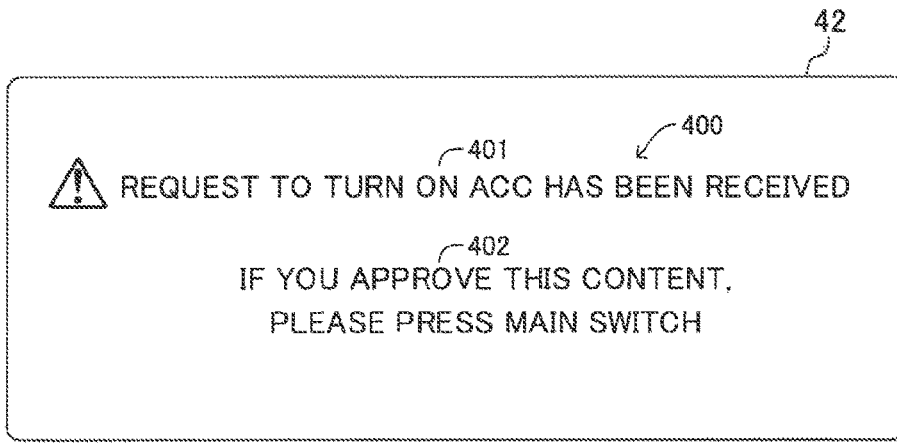

FIG.11

| TYPE OF SETTING CHANGE REQUEST | APPROVAL OPERATION |
|---|---|
| ACC-ON REQUEST | PRESS OPERATION OF MAIN SWITCH |
| ACC-OFF REQUEST | PRESS OPERATION OF CANCELLATION SWITCH |
| SPEED INCREASING REQUEST | LONG PRESS OPERATION OF SPEED INCREASING SWITCH |
| SPEED DECREASING REQUEST | LONG PRESS OPERATION OF SPEED DECREASING SWITCH |
| INTER-VEHICLE TIME SETTING REQUEST | PRESS OPERATION OF INTER-VEHICLE TIME SETTING SWITCH |
| ACC-ON REQUEST + SPEED SETTEING REQUEST | LONG PRESS OPERATION OF SPEED INCREASING SWITCH |
| ACC-ON REQUEST + LTA-ON REQUEST (HIGHWAY MODE) | PRESS OPERATION OF MAIN SWITCH |

SETTING CHANGE ASSIST APPARATUS

CROSS-REFERENCES TO RELATED APPLICATION

The present application claims priority to Japanese patent application No. JP 2019-190651 filed on Oct. 18, 2019, the content of which is hereby incorporated by reference in its entirety.

BACKGROUND

1. Technical Field

The present disclosure relates to a setting change assist apparatus configured to assist a driver in changing a setting state of driving support control.

2. Description of the Related Art

Hitherto, there has been known a vehicle configured to perform driving support control for supporting/assist a driving operation of a driver.

Examples of the driving support control include constant speed travel control, preceding-vehicle following-travel control, lane keeping control, autonomous driving control (self-driving control), and the like. The lane keeping control may be referred to as "lane tracing assist control (LTA)".

Further, there has been known a setting change assist apparatus configured to assist a driver in changing a setting state of the driving support control. The setting state is a target speed in the constant speed travel control, for example. One of known setting change assist apparatuses (hereinafter referred to as a "related-art apparatus") recognizes, through voice recognition processing, words regarding a vehicle speed spoken by a driver. The related-art apparatus sets the recognized vehicle speed as the target speed in the constant speed travel control (See Japanese Patent Application Laid-open No. 2014-000882).

However, the related-art apparatus may change the setting state of the driving support control to a setting state different from an intention of the driver due to the driver's voice/utterance being erroneously recognized.

SUMMARY

The present disclosure provides a technique capable of reducing the possibility that the setting state of the driving support control is erroneously set in a case where the driver speaks to change the setting state of the driving support control.

In one or more embodiments, there is provided a setting change assist apparatus for a vehicle, including: a controller configured to perform driving support control for the vehicle in accordance with a setting state of the driving support control; an operating device configured to be operable by a driver of the vehicle, and used for an operation changing the setting state of the driving support control; and a notification device configured to notify the driver of information. The controller is further configured to: execute voice recognition processing for recognizing an utterance of the driver; determine whether a setting change request is issued by the utterance, the setting change request being a request for changing the setting state of the driving support control; when determining through the voice recognition processing that the setting change request is issued, cause the notification device to notify the driver of confirmation information including information on a content of the setting change request, and information on a predetermined approval operation with respect to the setting change request; and when the driver performs an operation corresponding to the information on the approval operation by using the operating device, change the setting state of the driving support control in accordance with the setting change request.

The setting change request different from an intention of the driver may be issued due to his/her utterance being erroneously recognized. In such a case, according to the setting change assist apparatus having the above configuration, the confirmation information does not match the content uttered/spoken by the driver. Therefore, the driver can understand that his/her utterance has been erroneously recognized. In this situation, the driver does not perform the approval operation. Since the driver does not perform the approval operation, the setting change assist apparatus does not change the setting state of the driving support control in accordance with the setting change request. In this manner, even if the setting change request different from the intention of the driver is issued due to his/her utterance being erroneously recognized, it is possible to prevent the setting state of the driving support control from being set erroneously.

In one or more embodiments, the operating device includes a plurality of operating parts. The setting change request includes a plurality of types of requests. The approval operation is an operation on one of the plurality of operating parts. Further, the controller is configured to change the operating part to be operated when the driver performs the approval operation in accordance with the type of the setting change request.

According to the above configuration, the operating parts to be operated when performing the approval operation differ from each other depending on the type of the setting change request. Therefore, it is possible to confirm the intention of the driver more accurately.

In one or more embodiments, the controller is configured to perform the driving support control when an operating state as the setting state is an on state, and stop the driving support control when the operating state is an off state. The operating device includes a first operating part to be operated for changing the operating state from the off state to the on state, and a second operating part to be operated for changing the operating state from the on state to the off state. The setting change request includes an on request which is a request for changing the operating state from the off state to the on state, and an off request which is a request for changing the operating state from the on state to the off state. The controller is configured to: when determining through the voice recognition processing that the on request is issued, determine an operation on the first operating part as the approval operation; and when the operation on the first operating part is performed, change the operating state from the off state to the on state. The controller is configured to: when determining through the voice recognition processing that the off request is issued, determine an operation on the second operating part as the approval operation; and when the operation on the second operating part is performed, change the operating state from the on state to the off state.

According to the above configuration, even if the setting change request (the on request or the off request) different from the intention of the driver is issued due to his/her utterance being erroneously recognized, it is possible to prevent the setting state of the driving support control from being set erroneously.

In one or more embodiments, the controller is configured to set, as the setting state, a value of a control parameter for support provided by the driving support control, and perform the driving support control in accordance with the value of the control parameter. The operating device includes a third operating part to be operated for increasing the value of the control parameter, and a fourth operating part to be operated for decreasing the value of the control parameter. The setting change request includes an increasing request which is a request for increasing the value of the control parameter, and a decreasing request which is a request for decreasing the value of the control parameter. The controller is configured to: when determining through the voice recognition processing that the increasing request is issued, determine an operation on the third operating part as the approval operation; and when the operation on the third operating part is performed, increase the value of the control parameter in accordance with the increasing request. The controller is configured to: when determining through the voice recognition processing that the decreasing request is issued, determine an operation on the fourth operating part as the approval operation; and when the operation on the fourth operating part is performed, decrease the value of the control parameter in accordance with the decreasing request.

According to the above configuration, even if the setting change request (the increasing request or the decreasing request) different from the intention of the driver is issued due to his/her utterance being erroneously recognized, it is possible to prevent the value of the control parameter from being set erroneously.

In one or more embodiments, the controller is configured to, even in a case where the controller determines through the voice recognition processing that a request other than the off request is issued, when the driver performs the operation on the second operating part before performing the approval operation corresponding to the issued request, change the operating state from the on state to the off state.

When the driver operates the second operating part, the driver intends to perform a driving operation by himself/herself. According to the above configuration, in a case where the driver operates the second operating part before performing the approval operation, it is possible to immediately reflect the intention of the driver for changing the operating state of the driving support control to the off state.

In one or more embodiments, the controller is configured to, when determining through the voice recognition processing that two or more request are issued as the setting change request, determine an operation on one of the plurality of operating parts as the approval operation.

According to the above configuration, even if two or more requests are issued as the setting change request, the driver operates one of the plurality of operating parts to thereby approve those requests. Since it is not necessary for the driver to operate two or more operating parts, it is possible to reduce the possibility that the driver feels the operation to be troublesome.

In one or more embodiments, the controller is configured to perform the driving support control when an operating state as the setting state is an on state, and stop the driving support control when the operating state is an off state. The operating device includes a first operating part to be operated for changing the operating state from the off state to the on state, and a second operating part to be operated for changing the operating state from the on state to the off state. The setting change request includes an on request which is a request for changing the operating state from the off state to the on state, and an off request which is a request for changing the operating state from the on state to the off state. The controller is configured to: when determining through the voice recognition processing that the on request is issued, determine an operation on the first operating part as the approval operation; and when the operation on the first operating part is performed, change the operating state from the off state to the on state. The controller is configured to, when determining through the voice recognition processing that the off request is issued, change the operating state from the on state to the off state without requesting the driver to perform the approval operation.

When the off request is issued, the driver often wishes to perform a driving operation by himself/herself as soon as possible. In such a case, when the driver is requested to perform the approval operation, the driver may feel the operation to be troublesome. According to the above configuration, when the off request is issued, the controller changes the operating state of the driving support control to the off state without requesting the driver to perform the approval operation. Accordingly, it is possible to reduce the possibility that the driver feels troublesome.

According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

BRIEF DESCRIPTION OF THE DRAWINGS

FIG. 2 is a diagram for illustrating a word table according to at least one embodiment.

FIG. 3 is a diagram for illustrating an approval operation table according to at least one embodiment.

FIG. 4 is a diagram for illustrating confirmation information displayed on a display when an ACC-on request is issued.

FIG. 11 is a diagram for illustrating an approval operation table according to a modification example.

DESCRIPTION OF THE EMBODIMENTS

Figure 1:
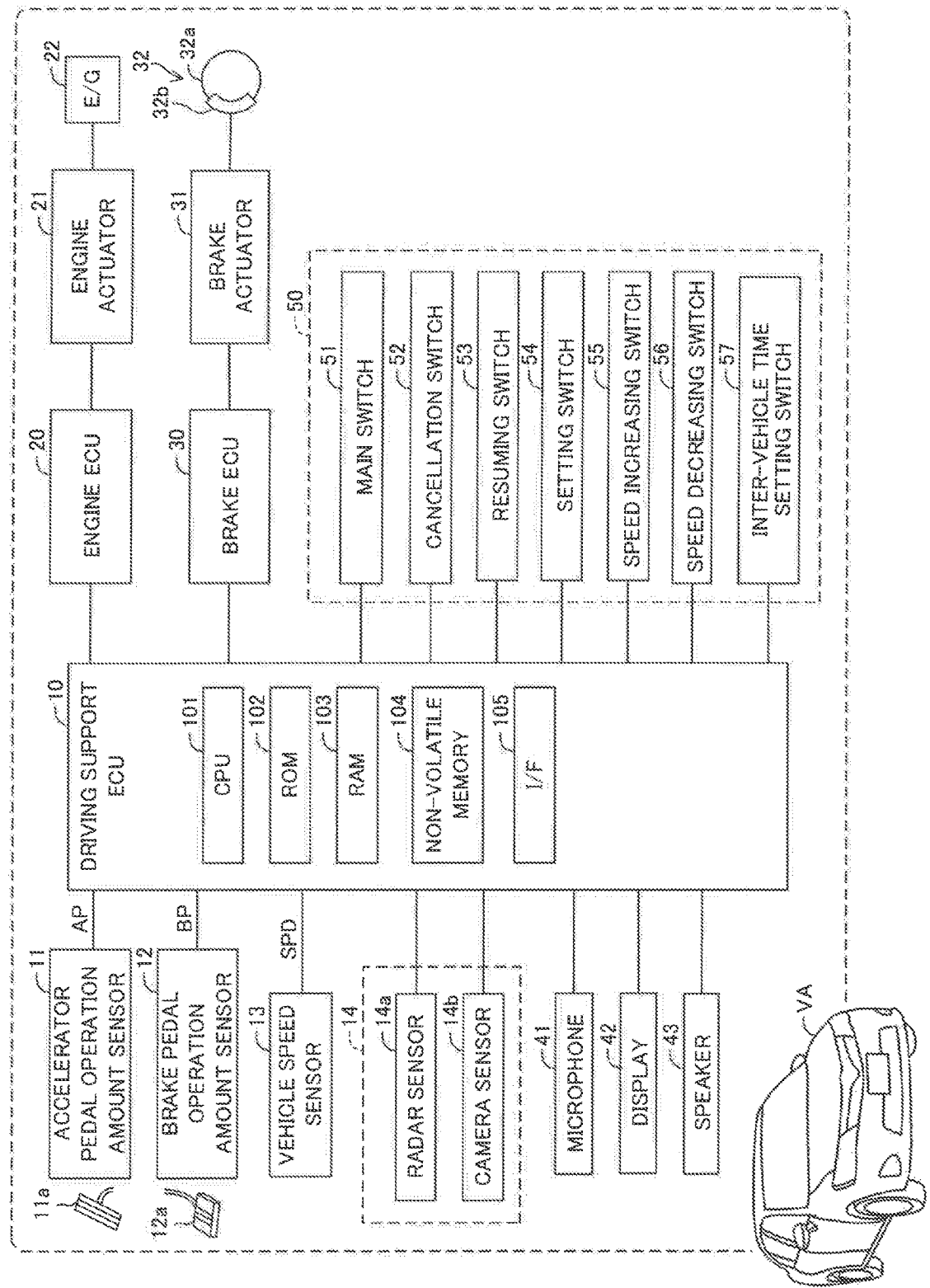
FIG. 1 is a schematic configuration diagram of a setting change assist apparatus according to at least one embodiment.

As illustrated in FIG. 1, a setting change assist apparatus according to at least one embodiment is applied to a vehicle VA. The setting change assist apparatus is hereinafter simply referred to as "apparatus". The apparatus includes a driving support ECU 10, an engine ECU 20, and a brake ECU 30.

These ECUs each includes an electronic control unit having a microcomputer as a main component. The ECUs are connected to each other such that information can be transmitted and received to and from each other via a controller area network (CAN) (not shown).

The microcomputer herein includes a CPU, a ROM, a RAM, a non-volatile memory, an interface I/F, and the like. For example, the driving support ECU 10 includes a CPU 101, a ROM 102, a RAM 103, a non-volatile memory 104, an interface 105, and the like. The CPU 101 executes instructions (programs and routines) stored in the ROM 102 to realize various functions.

The driving support ECU 10 is connected to sensors listed below, and is configured to receive detection signals or output signals from those sensors. Alternatively, each sensor may be connected to an ECU other than the driving support ECU 10. In such a case, the driving support ECU 10 receives, through the CAN, the detection signal or output signal of that sensor from the ECU to which that sensor is connected.

An accelerator pedal operation amount sensor 11 is configured to detect an operation amount (accelerator opening) AP of an accelerator pedal 11a, and output a signal indicative of the accelerator pedal operation amount AP.

A brake pedal operation amount sensor 12 is configured to detect an operation amount BP of a brake pedal 12a, and output a signal indicative of the brake pedal operation amount BP.

A vehicle speed sensor 13 is configured to detect a travel speed SPD of the vehicle (that is, vehicle speed), and output a signal indicative of the vehicle speed SPD.

A surrounding situation sensor 14 is configured to obtain information on a road around the vehicle VA (e.g., a traveling lane in which the vehicle VA travels) and information on three-dimensional objects present on the road. Examples of the three-dimensional objects include moving objects such as automobiles (other vehicles), pedestrians, and bicycles, as well as stationary objects such as guard rails and fences. In the following description, these three-dimensional objects are simply referred to as "objects". For example, the surrounding situation sensor 14 includes a radar sensor 14a and a camera sensor 14b.

The surrounding situation sensor 14 determines whether or not an object is present, and calculates information on a relative relationship between the vehicle VA and the object. The information on the relative relationship between the vehicle VA and the object includes a distance between the vehicle VA and the object, an orientation (or position) of the object with respect to the vehicle VA, a relative speed of the object with respect to the vehicle VA, and other such information. Hereinafter, the information obtained by the surrounding situation sensor 14 (including the information on the relative relationship between the vehicle VA and the object) is referred to as "object information". The surrounding situation sensor 14 outputs the object information to the driving support ECU 10.

The engine ECU 20 is connected to an engine actuator 21. The engine actuator 21 includes a throttle valve actuator configured to change an opening degree of a throttle valve of an engine 22. The engine ECU 20 can drive the engine actuator 21 to change a torque generated by the engine 22. The torque generated by the engine 22 is transmitted to drive wheels via a transmission (not shown). Thus, the engine ECU 20 can control the engine actuator 21 to control a driving force of the vehicle VA, to thereby change an acceleration or acceleration state of the vehicle VA.

When the vehicle VA is a hybrid vehicle, the engine ECU 20 is capable of controlling a driving force to be generated by any one of or both of "an engine and a motor" serving as vehicle driving sources. Further, when the vehicle VA is an electric vehicle, the engine ECU 20 is capable of controlling a driving force to be generated by a motor serving as a vehicle driving source.

Further, the brake ECU 30 is connected to a brake actuator 31 which is a hydraulic control actuator of friction brake mechanisms 32. The brake actuator 31 is provided in a hydraulic circuit (not shown) extending between a master cylinder configured to pressurize hydraulic oil with a stepping force applied to the brake pedal 12a and the friction brake mechanisms 32 provided in front left, front right, rear left, and rear right wheels. The brake actuator 31 adjusts a hydraulic pressure to be supplied to a wheel cylinder integrated into a brake caliper 32b in the brake mechanism 32 in accordance with an instruction from the brake ECU 30. With the wheel cylinder being operated by the hydraulic pressure, a brake pad is pressed against a brake disc 32a to generate a friction braking force. Thus, the brake ECU 30 can control the brake actuator 31 to control the braking force of the vehicle VA, to thereby change an acceleration state (a deceleration, namely, a negative acceleration) of the vehicle VA.

The driving support ECU 10 is connected to a microphone 41, a display 42, and a speaker 43. The microphone 41 acquires/detects a voice uttered by an occupant (for example, a driver) of the vehicle VA, and outputs voice data to the driving support ECU 10. The display 42 is a multi-information display provided in front of a seat of the driver. A head-up display may be adopted as the display 42. When the speaker 43 receives a sound command from the driving support ECU 10, the speaker 43 utters/generates a sound according to the sound command. The display 42 and the speaker 43 may be collectively referred to as a "notification device".

A steering wheel (not shown) of the vehicle VA has an operating device 50 for following-travel inter-vehicle-distance control. The operating device 50 is disposed at a position facing the driver and operable by the driver. The following-travel inter-vehicle-distance control may be referred to as "Adaptive Cruise Control". Hereinafter, this control is simply referred to as "ACC".

The driving support ECU 10 is connected to switches (operating parts) on the operating device 50 listed below, and is configured to receive output signals from those switches. The operating device 50 includes a main switch 51, a cancellation switch 52, a resuming switch 53, a setting switch 54, a speed increasing switch 55, a speed decreasing switch 56, and an inter-vehicle time setting switch 57. Methods for operating these switches 51 to 57 will be described later.

(Outline of ACC)

Hereinafter, the driving support ECU 10 will be simply referred to as "ECU 10". The ECU 10 is configured to perform the ACC as the driving support control. The ACC itself is well known (see, for example, Japanese Patent Application Laid-Open (kokai) No. 2014-148293, Japanese Patent Application Laid-Open (kokai) No. 2006-315491, and Japanese Patent No. 4172434).

The ACC includes two types of controls; i.e., constant speed travel control, and preceding-vehicle following-travel control. The constant speed travel control is control for adjusting the acceleration of the vehicle VA such that the travel speed of the vehicle VA matches (becomes equal to) a target speed (set speed) Vset, without requiring operations of the accelerator pedal 11a and the brake pedal 12a. The preceding-vehicle following-travel control is control for causing the vehicle VA to follow a preceding vehicle travelling immediately ahead of the vehicle VA, while maintaining an inter-vehicle distance between the preceding vehicle and the vehicle VA at a target inter-vehicle distance.

When the ACC is started (the main switch 51 becomes an on state as described later), the ECU 10 determines, on the basis of the object information obtained by the surrounding situation sensor 14, whether or not there is a following target vehicle. The following target vehicle is a vehicle which is traveling ahead of (immediately ahead of) the vehicle VA and which is to be followed by the vehicle VA. For example, the ECU 10 determines whether or not a detected object (n) is present within a predetermined followed-up vehicle area.

In the case where the object (n) is not present in the followed-up vehicle area, the ECU 10 determines that there is no following target vehicle. In this case, the ECU 10 performs the constant speed travel control. At the start of the ACC, the target speed Vset may be set to the vehicle speed SPD at that time point. The ECU 10 determines a target acceleration Gtgt such that the vehicle speed SPD of the vehicle VA matches (becomes equal to) the target speed Vset. In order that the acceleration of the vehicle VA matches the target acceleration Gtgt, the ECU 10 controls the drive force by controlling the engine actuator 21 by using the engine ECU 20 and, when necessary, controls the braking force by controlling the brake actuator 31 by using the brake ECU 30.

In contrast, in the case where the object (n) is present in the followed-up vehicle area for a predetermined period of time or longer, the ECU 10 chooses that object (n) as the following target vehicle (a). The ECU 10 then performs the preceding-vehicle following-travel control. Specifically, the ECU 10 determines the target acceleration Gtgt on the basis of a "deviation between an inter-vehicle distance to the following target vehicle (a) and a target inter-vehicle distance Dset" and a "relative speed of the following target vehicle (a) with respect to the vehicle VA," etc. The target inter-vehicle distance Dset is calculated by multiplying a target inter-vehicle time Ttgt by the vehicle speed SPD of the vehicle VA (Dset=Ttgt×SPD). The driver can set or change the target inter-vehicle time Ttgt by operating the inter-vehicle time setting switch 57. In order to render the acceleration of the vehicle VA coincident with the target acceleration Gtgt, as described above, the ECU 10 controls the engine actuator 21 and, when necessary, controls the brake actuator 31.

(Methods of Operating Switches of Operating Device)

Next, methods of operating the respective switches 51 to 57 of the operating device 50 will be described. The main switch 51 is a switch to be operated by the driver when the ACC is started or stopped. Every time the main switch 51 is depressed, a state of the main switch 51 changes between on and off states. When the state of the main switch 51 is switched from the off state to the on state, the ECU 10 changes an operating state of the ACC from an off state to an on state (that is, the ECU 10 starts the ACC). Meanwhile, when the state of the main switch 51 is switched from the on state to the off state, the ECU 10 changes the operating state of the ACC from the on state to the off state (that is, the ECU 10 stops the ACC).

The cancellation switch 52 is a switch to be operated by the driver when the ACC is cancelled (temporarily stopped). Every time the cancellation switch 52 is depressed, a state of the cancellation switch 52 changes between on and off states. When the cancellation switch 52 becomes the on state in a period during which the main switch 51 is in the on state (the ACC is being executed), the ECU 10 changes the operating state of the ACC from the on state to a temporary off state (hereinafter referred to as a "cancellation state") to thereby stops the ACC.

The resuming switch 53 is a switch to be operated by the driver when the ACC is resumed after the operating state of the ACC is changed to the cancellation state. The resuming switch 53 is configured to become an on state when pressed by the driver, and become an off state when not pressed by the driver. When the state of the resuming switch 53 is changed from the off state to the on state in a situation in which the main switch 51 is in the on state and the cancellation switch 52 is in the on state (namely, in a state in which the operating state of the ACC is the cancellation state), the ECU 10 changes the operating state of the ACC to the on state (that is, the ECU 10 resumes the ACC). When the ACC is resumed, the ECU 10 changes the state of the cancellation switch 52 to the off state. Further, the ECU 10 resumes the constant speed travel control by using the target speed Vset used at the time when the operating state of the ACC was changed to the cancellation state.

The setting switch 54 is a switch to be operated by the driver when the target speed Vset is set. The setting switch 54 is configured to become an on state when pressed by the driver, and become an off state when not pressed by the driver. When the state of the setting switch 54 is changed from the off state to the on state after the ACC is started, the ECU 10 sets the target speed Vset to the "vehicle speed SPD at the point in time when the setting switch 54 becomes the on state (namely, the point in time when the driver presses the setting switch 54)."

The speed increasing switch 55 is a switch to be operated by the driver when the target speed Vset is increased. The speed increasing switch 55 is configured to become an on state when pressed by the driver, and become an off state when not pressed by the driver. In another example, the speed increasing switch 55 and the resuming switch 53 may be integrated into one switch.

An "operation performed on the speed increasing switch 55 in such a manner that the on state of the speed increasing switch 55 is continued (maintained) for a predetermined first long press time Tlp1 or longer" will be referred to as a "long press operation of the speed increasing switch 55." In the case where the long press operation of the speed increasing switch 55 is performed in a situation in which the operating state of the ACC is the on state, the ECU 10 increases the target speed Vset while the on state of the speed increasing switch 55 continues after elapse of the first long press time Tlp1. Specifically, the ECU 10 increases the target speed Vset stepwise (by a first increase amount Vi1 each time) every time a first interval time Tin1 elapses.

An "operation performed on the speed increasing switch 55 in such a manner that, after the speed increasing switch 55 has been switched from the off state to the on state, the state of the speed increasing switch 55 is returned from the on state to the off state before elapse of the first long press time Tlp1" will be referred to as a "short press operation of the speed increasing switch 55." In the case where the short press operation of the speed increasing switch 55 is performed in a situation in which the operating state of the ACC is the on state, the ECU 10 increases the target speed Vset by a second increase amount Vi2.

The speed decreasing switch 56 is a switch to be operated by the driver when the target speed Vset is decreased. The speed decreasing switch 56 is configured to become an on state when pressed by the driver, and become an off state when not pressed by the driver.

An "operation performed on the speed decreasing switch 56 in such a manner that the on state of the speed decreasing switch 56 is continued (maintained) for a predetermined second long press time Tlp2 or longer" will be referred to as a "long press operation of the speed decreasing switch 56." In the case where the long press operation of the speed decreasing switch 56 is performed in a situation in which the operating state of the ACC is the on state, the ECU 10 decreases the target speed Vset while the on state of the speed decreasing switch 56 continues after elapse of the second long press time Tlp2. Specifically, the ECU 10 decreases the target speed Vset stepwise (by a first decrease amount Vd1 each time) every time a second interval time Tin2 elapses.

An "operation performed on the speed decreasing switch 56 in such a manner that, after the speed decreasing switch 56 has been switched from the off state to the on state, the state of the speed decreasing switch 56 is returned from the on state to the off state before elapse of the second long press time Tlp2" will be referred to as a "short press operation of the speed decreasing switch 56." In the case where the short press operation of the speed decreasing switch 56 is performed in a situation in which the operating state of the ACC is the on state, the ECU 10 decreases the target speed Vset by a second decrease amount Vd2.

The first long press time Tlp1 and the second long press time Tlp2 may be set to the same value. The first increase amount Vi1 and the first decrease amount Vd1 may be set to the same value. The second increase amount Vi2 and the second decrease amount Vd2 may be set to the same value. In addition, the first interval time Tin1 and the second interval time Tin2 may be set to the sane value.

The inter-vehicle time setting switch 57 is a switch to be operated by the driver when the target inter-vehicle time Ttgt for the preceding-vehicle following-travel control is set. Every time the inter-vehicle time setting switch 57 is depressed in a situation in which the operating state of the ACC is the on state, the target inter-vehicle time Ttgt is changed. The driver can select one of three levels of time (long, medium, short) as the target inter-vehicle time Ttgt.

Figure 9:
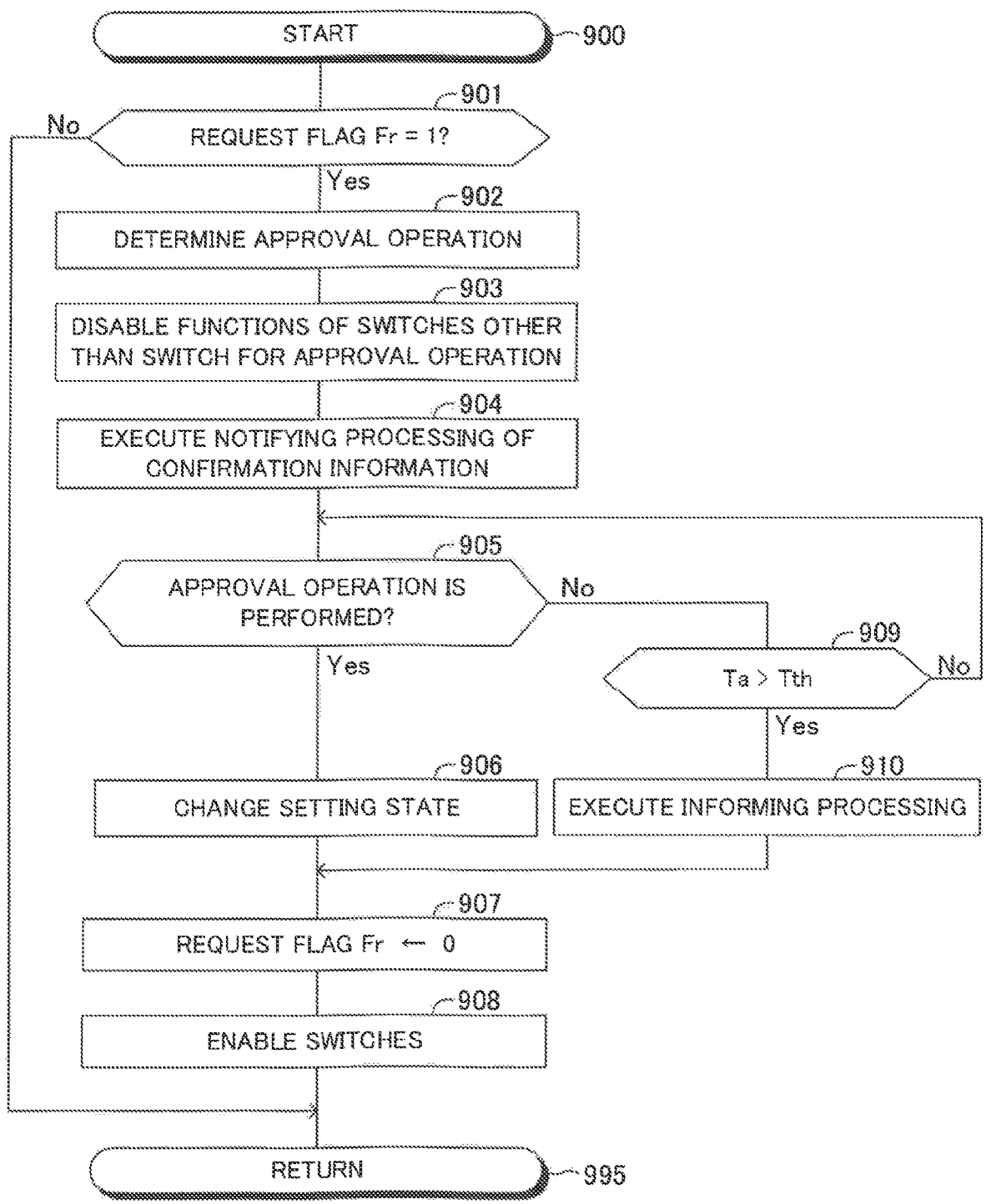
FIG. 9 is a flowchart for illustrating a "request approval routine" to be executed by the CPU of the driving support ECU according to at least one embodiment.

Further, the ECU 10 can disable the respective functions of the switches 51 to 57 under a specific situation described later (when a routine of FIG. 9 is executed). For example, when the ECU 10 disables the function of the main switch 51, the state of the main switch 51 is not changed even if the driver operates (depresses) the main switch 51.

(Voice Recognition Processing)

The ECU 10 executes voice recognition processing on the voice data acquired from the microphone 41, and stores a voice recognition result in the RAM 103 as text data. The ECU 10 holds/maintains the voice recognition result in the RAM 103 for a predetermined period of time. The ROM 102 of the ECU 10 stores therein an acoustic model and a recognition dictionary in advance. The ECU 10 compares the acquired voice data with the acoustic model to extract features, and matches the extracted features with the recognition dictionary to thereby perform voice recognition. Such voice recognition processing is well known (see, for example, Japanese Patent Application Laid-open No. 2012-063537 and WO 2007/091462).

The ECU 10 determines whether or not a setting change request is issued/performed on the basis of the voice recognition result, the operating state of the ACC, a traveling state (including the vehicle speed SPD) of the vehicle VA, and the like. The setting change request is a request for changing a setting state of the ACC.

The setting change request includes a plurality of types of requests. Specifically, the setting change request includes an ACC-on request, an ACC-off request (cancellation request), a speed increasing request, and a speed decreasing request. The ACC-on request is a request for changing the operating state of the ACC from the off state to the on state. The ACC-off request is a request for changing the operating state of the ACC from the on state to the cancellation state (temporary off state). The speed increasing request is a request for increasing the target speed Vset which is a control parameter for the constant speed travel control. The speed decreasing request is a request for decreasing the target speed Vset.

1. ACC-On Request

The ECU 10 determines that the ACC-on request is issued when all of the following conditions A1 and A2 are satisfied.

(Condition A1): The voice recognition result includes a "word related to the ACC" and a "word related to the on state".

(Condition A2): The operating state of the ACC is the off state or the cancellation state at the present time.

The ECU 10 refers to a word table 200 illustrated in FIG. 2 to determine whether or not the condition A1 is satisfied. The word table 200 is stored in the ROM 102. The word table 200 defines a set of words related to the ACC, a set of words related to the on state, a set of words related to the off state, a set of words related to the target speed, and the like. It is now assumed that the voice recognition result is "start ACC". In this case, the voice recognition result includes the word related to the ACC (i.e., "ACC"), and the word related to the on state (i.e., "start"). Therefore, the ECU 10 determines that the condition A1 is satisfied.

2. ACC-Off Request

The ECU 10 determines that the ACC-off request is issued when all of the following conditions B1 and B2 are satisfied.

(Condition B1): The voice recognition result includes the "word related to the ACC" and the "word related to the off state".

(Condition B2): The operating state of the ACC is the on state at the present time.

As described above, the ECU 10 refers to the word table 200 to determine whether or not the condition B1 is satisfied. It is now assumed that the voice recognition result is "cancel cruise control". In this case, the voice recognition result includes the word related to the ACC (i.e., "cruise control"), and the word related to the off state (i.e., "cancel"). Therefore, the ECU 10 determines that the condition B1 is satisfied.

3. Speed Increasing Request

The ECU 10 determines that the speed increasing request is issued when all of the following conditions C1 to C4 are satisfied.

(Condition C1): The voice recognition result includes the "word related to the target speed" and a "numerical value related to the vehicle speed". The "numerical value related to the vehicle speed" herein includes a simple numerical value, and a combination of a numerical value and a predetermined unit (e.g., "km", "mile").

(Condition C2): The operating state of the ACC is the on state, and the constant speed travel control is being performed at the present time.

(Condition C3): The following relational expression is satisfied: SPD<Vn. Here, "SPD" is the vehicle speed at the present time, and "Vn" is the "numerical value related to the vehicle speed" in the voice recognition result.

(Condition C4): The following relational expression is satisfied: Vth1<Vn<Vth2. Here, "Vth1" is a lower limit value of the vehicle speed that can be set as the target speed Vset, and "Vth2" is an upper limit value of the vehicle speed that can be set as the target speed Vset.

As described above, the ECU 10 refers to the word table 200 to determine whether or not the condition C1 is satisfied. It is now assumed that the voice recognition result is "set target speed to 80 km". In this case, the voice recognition result includes the word related to the target speed (i.e., "target speed"), and the numerical value related to the vehicle speed (i.e., "80 km"). Therefore, the ECU 10 determines that the condition C1 is satisfied.

4. Speed Decreasing Request

The ECU 10 determines that the speed decreasing request is issued when all of the following conditions D1 to D4 are satisfied.

(Condition D1): The voice recognition result includes the "word related to the target speed" and the "numerical value related to the vehicle speed".

(Condition D2): The operating state of the ACC is the on state, and the constant speed travel control is being performed at the present time.

(Condition D3): The following relational expression is satisfied: SPD>Vn. As described above, "SPD" is the vehicle speed at the present time, and "Vn" is the "numerical value related to the vehicle speed" in the voice recognition result.

(Condition D4): The following relational expression is satisfied: Vth1<Vn<Vth2.

As described above, the ECU 10 refers to the word table 200 to determine whether or not the condition D1 is satisfied.

(Setting Change Confirmation Processing)

When the ECU 10 determines that the setting change request is issued, the ECU 10 executes "setting change confirmation processing" for making the driver confirm/check the content of the setting change request. Specifically, the ECU 10 refers to an approval operation table 300 illustrated in FIG. 3 to determine an approval operation in accordance with the type of the setting change request. The approval operation is an operation to be performed by the driver when approving the content of the setting change request made through the driver's utterance. In the present example, the approval operation is an operation on one of the switches 51 to 57. The approval operation table 300 is stored in the ROM 102. The approval operation table 300 defines a relationship between the type of the setting change request and the approval operation.

The ECU 10 uses the notification device (including the display 42 and the speaker 43) to notify/inform the driver of confirmation information for causing the driver to confirm/check the content of the setting change request. In the present example, the confirmation information includes information on the content of the setting change request determined through the voice recognition processing, and information on the approval operation determined by referring to the approval operation table 300.

the "content of the setting change request" in the confirmation information matches the request intended by the driver (that is, the content spoken by the driver), the driver performs the approval operation notified by the confirmation information. When the approval operation is performed by the driver, the ECU 10 changes the setting state of the ACC in accordance with the setting change request. As a result, the ECU 10 performs (or stops) the ACC in accordance with the changed setting state.

On the other hand, the "content of the setting change request" in the confirmation information does not match the request intended by the driver, the driver can recognize that his or her voice/utterance was erroneously recognized. Therefore, the driver does not perform the approval operation. In this case, the ECU 10 does not change the setting state of the ACC in accordance with the setting change request. In this manner, even if the setting change request different from the driver's intention is made due to the utterance being erroneously recognized, the apparatus can prevent the setting state of the ACC from being set erroneously. The setting change confirmation processing for each of the ACC-on request, the ACC-off request, the speed increasing request, and the speed decreasing request will be described below in order.

1. Setting Change Confirmation Processing: ACC-On Request

When the ECU 10 determines that the ACC-on request is issued, the ECU 10 refers to the approval operation table 300 to determine the "press operation of the main switch 51" as the approval operation. Then, the ECU 10 executes notifying processing of the confirmation information by using the notification device (42 and 43). Specifically, the ECU 10 displays confirmation information 400 illustrated in FIG. 4 on the display 42. The confirmation information 400 includes information 401 indicating that the ACC-on request has been received, and information 402 on the approval operation corresponding to the ACC-on request. Further, the ECU 10 causes the speaker 43 to utter the information 401 and the information 402.

When the information 401 matches the content uttered by the driver himself/herself, the driver performs the press operation of the main switch 51 as the approval operation. When the press operation of the main switch 51 is performed within a predetermined time threshold Tth from the time point at which the above-described notifying processing is executed, the ECU 10 changes the operating state of the ACC to the on state.

2. Setting Change Confirmation Processing: ACC-off Request

Figure 5:
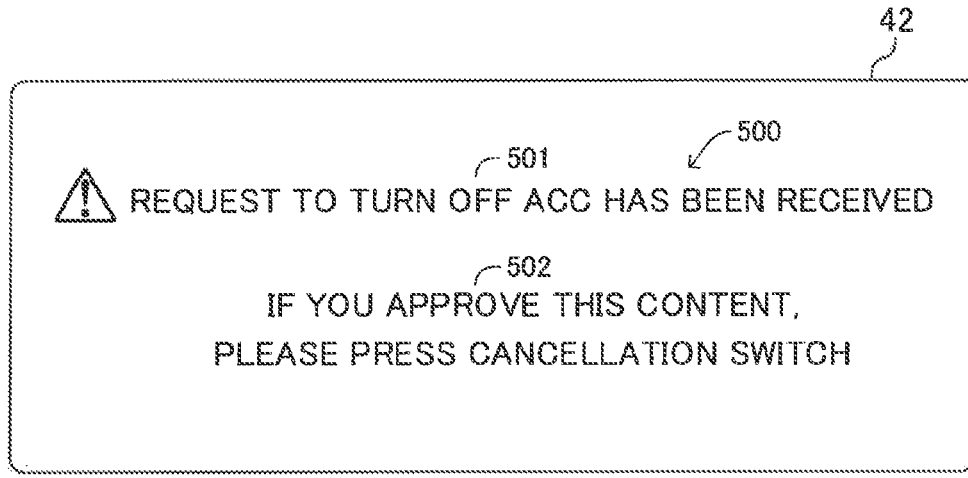
FIG. 5 is a diagram for illustrating confirmation information displayed on the display when an ACC-off request is issued.

When the ECU 10 determines that the ACC-off request is issued, the ECU 10 refers to the approval operation table 300 to determine the "press operation of the cancellation switch 52" as the approval operation. Then, the ECU 10 displays confirmation information 500 illustrated in FIG. 5 on the display 42. The confirmation information 500 includes information 501 indicating that the ACC-off request has been received, and information 502 on the approval operation corresponding to the ACC-off request. Further, the ECU 10 causes the speaker 43 to utter the information 501 and the information 502.

When the information 501 matches the content uttered by the driver himself/herself, the driver performs the press operation of the cancellation switch 52 as an approval operation. When the press operation of the cancellation switch 52 is performed within the time threshold Tth from the time point at which the above-described notifying processing is executed, the ECU 10 changes the operating state of the ACC to the cancellation state (temporary off state).

3. Setting Change Confirmation Processing: Speed Increasing Request

Figure 6:
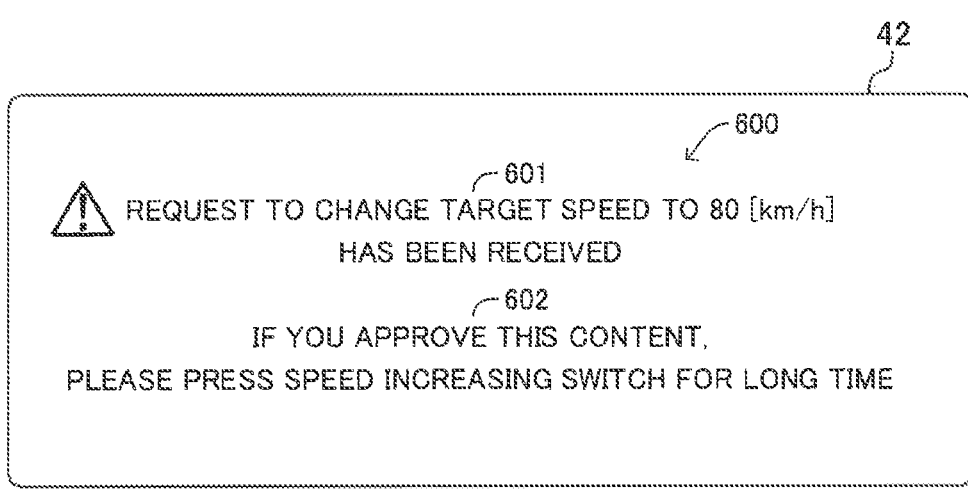
FIG. 6 is a diagram for illustrating confirmation information displayed on the display when a speed increasing request is issued.

When the ECU 10 determines that the speed increasing request is issued, the ECU 10 refers to the approval operation table 300 to determine the "long press operation of the speed increasing switch 55" as the approval operation. Then, the ECU 10 displays confirmation information 600 illustrated in FIG. 6 on the display 42. The confirmation information 600 includes information 601 indicating that the speed increasing request has been received, and information 602 on the approval operation corresponding to the speed increasing request. Further, the ECU 10 causes the speaker 43 to utter the information 601 and the information 602.

When the information 601 matches the content uttered by the driver himself/herself, the driver performs the long press operation of the speed increasing switch 55 as the approval operation. When the long press operation of the speed increasing switch 55 is performed within the time threshold Tth from the time point at which the above-described notifying processing is executed, the ECU 10 sets the target speed Vset in accordance with the speed increasing request (that is, the content of the information 601).

4. Setting Change Confirmation Processing: Speed Decreasing Request

Figure 7:
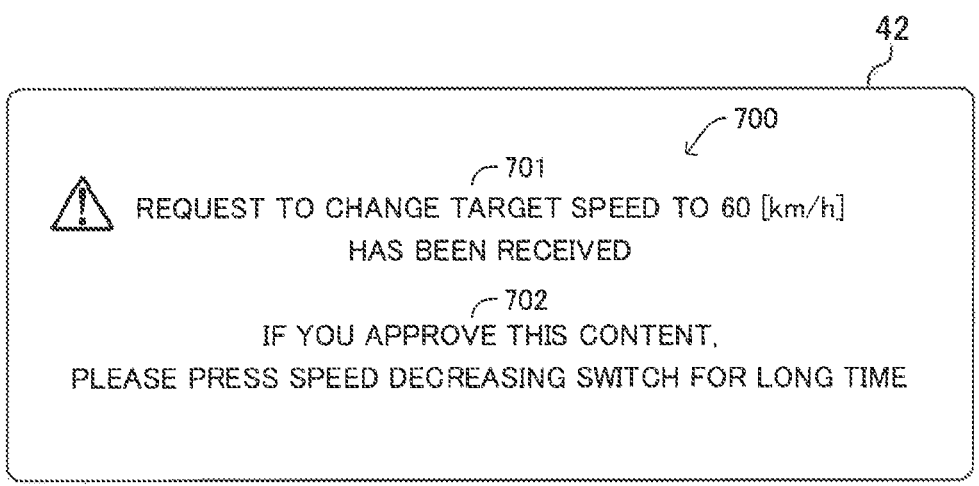
FIG. 7 is a diagram for illustrating confirmation information displayed on the display when a speed decreasing request is issued.

When the ECU 10 determines that the speed decreasing request is issued, the ECU 10 refers to the approval operation table 300 to determine the "long press operation of the speed decreasing switch 56" as the approval operation. Then, the ECU 10 displays confirmation information 700 illustrated in FIG. 7 on the display 42. The confirmation information 700 includes information 701 indicating that the speed decreasing request has been received, and information 702 on the approval operation corresponding to the speed decreasing request. Further, the ECU 10 causes the speaker 43 to utter the information 701 and the information 702.

When the information 701 matches the content uttered by the driver himself/herself, the driver performs the long press operation of the speed decreasing switch 56 as the approval operation. When the long press operation of the speed decreasing switch 56 is performed within the time threshold Tth from the time point at which the above-described notifying processing is executed, the ECU 10 sets the target speed Vset in accordance with the speed decreasing request (that is, the content of the information 701).

(Operation)

Figure 8:
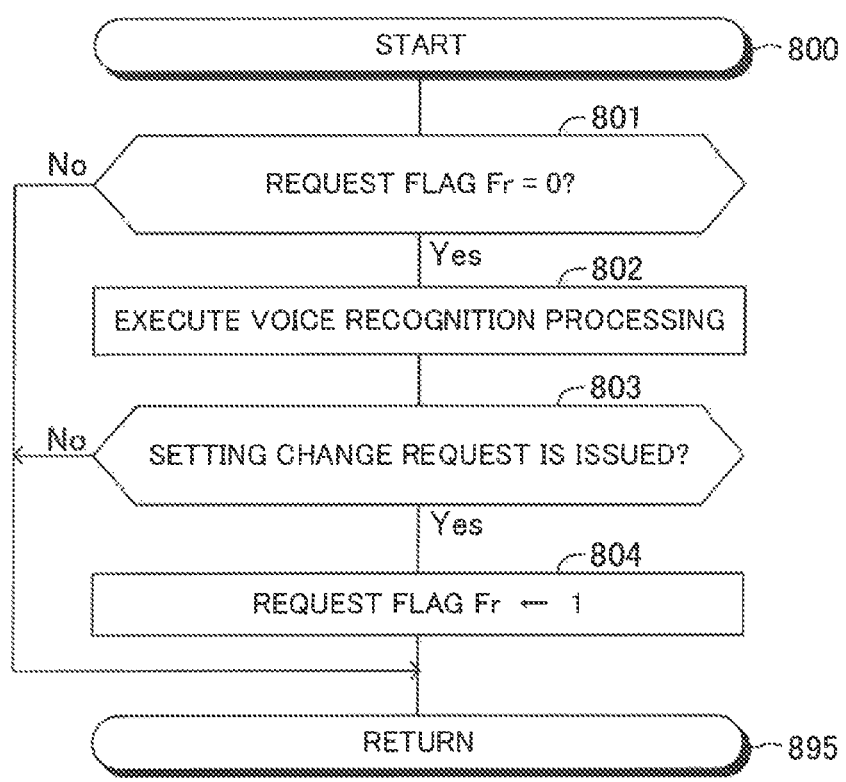
FIG. 8 is a flowchart for illustrating a "request detection/determination routine" to be executed by a CPU of a driving support ECU according to at least one embodiment.

Every time a predetermined time (hereinafter referred to as "first time") elapses, the CPU 101 of the driving support ECU 10 is configured to execute a routine illustrated in FIG. 8. Hereinafter the CPU 101 of the driving support ECU 10 is simply referred to as the "CPU".

Further, every time the first time elapses, the CPU executes a routine (not shown) to acquire the voice data from the microphone 41. Furthermore, every time the first time elapses, the CPU executes a routine (not shown) to acquire the detection signals or output signals from the sensors 11 to 14 and the switches 51 to 57.

When a predetermined timing has come, the CPU starts the process from Step 800 of FIG. 8 and proceeds to Step 801 to determine whether or not a value of a setting change request flag Fr (hereinafter simply referred to as "request flag Fr") is "0". The value of the request flag Fr is set to "1" when the setting change request is issued through the utterance of the driver (see Step 804 described later). The value of the request flag Fr is set to "0" in an initialization routine to be executed by the CPU when a position of an ignition switch (not shown) is changed from an off position to an on position. Further, the value of the request flag Fr is set to "0" also in Step 907 of a routine of FIG. 9 described later.

When the value of the request flag Fr is not "0", the CPU makes a "No" determination in Step 801, and proceeds directly to Step 895 to end the current execution of the present routine.

It is now assumed that the value of the request flag Fr is "0". In this case, the CPU makes a "Yes" determination in Step 801, and proceeds to Step 802 to execute the voice recognition processing for the voice data acquired from the microphone 41 as described above. Next, in Step 803, the CPU determines whether or not the setting change request (that is, any one of the ACC-on request, the ACC-off request, the speed increasing request, and the speed decreasing request) is issued/performed.

It is assumed that the setting change request is issued. In this case, the CPU makes a "Yes" determination in Step 803, and proceeds to Step 804 to set the value of the request flag Fr to "1". Thereafter, the CPU proceeds to Step 895 to end the current execution of the present routine.

On the other hand, when the setting change request is not issued, the CPU makes a "No" determination in Step 803, and proceeds directly to Step 895 to end the current execution of the present routine.

Further, every time a predetermined second time equal to the first time or longer than the first time elapses, the CPU is configured to execute a routine illustrated in FIG. 9.

When a predetermined timing has come, the CPU starts the process from Step 900 of FIG. 9, and proceeds to Step 901 to determine whether or not the value of the request flag Fr is "1". When the value of the request flag Fr is not "1", the CPU makes a "No" determination in Step 901, and proceeds directly to Step 995 to end the current execution of the present routine.

It is now assumed that the setting change request is issued through the utterance of the driver, and therefore, the value of the request flag Fr is "1" (see Step 804). In this case, the CPU makes a "Yes" determination in Step 901, and sequentially executes Step 902 to Step 904 which are described below. Thereafter, the CPU proceeds to Step 905.

Step 902: The CPU refers to the approval operation table 300 illustrated in FIG. 3 to determine the approval operation in accordance with the type of the setting change request.

Step 903: The CPU disables the functions of the switches other than the switch used for the approval operation determined in Step 902. For example, when the ACC-on request is issued, the CPU disables the respective functions of switches (52, 53, 54, 55, 56 and 57) other than the main switch 51.

Step 904: The CPU executes the notifying processing of the confirmation information (400, 500, 600 or 700) by using the notification device (the display 42 and the speaker 43) as described above.

As the CPU proceeds to Step 905, the CPU determines whether or not the approval operation (which has been determined in Step 902) is performed. When the approval operation is performed, the CPU makes a "Yes" determination in Step 905, and sequentially executes Step 906 to Step 908 which are described below. Thereafter, the CPU proceeds to Step 995 to end the current execution of the present routine.

Step 906: The CPU changes the setting state of the ACC in accordance with the setting change request.

Step 907: The CPU sets the value of the request flag Fr to "0".

Step 908: The CPU enables the respective functions of the switches that were disabled in Step 903.

On the other hand, when the approval operation is not performed, the CPU makes a "No" determination in Step 905, and proceeds to Step 909. In Step 909, the CPU determines whether an elapsed time Ta since a time point at which the notifying processing was executed in Step 904 is longer than the time threshold Tth. When the elapsed time Ta is equal to or shorter than the time threshold Tth, the CPU makes a "No" determination in Step 909, and returns to Step 905 to determine whether the approval operation is performed.

When the elapsed time Ta is longer than the time threshold Tth without the approval operation being performed, the CPU makes a "Yes" determination in Step 909, and proceeds to Step 910 to execute informing processing. Specifically, the CPU uses the notification device to inform the driver that the approval operation is not performed. Next, the CPU sequentially executes Steps 907 and 908 as described above. Thereafter, the CPU proceeds to Step 995 to end the current execution of the present routine. In this case, since the driver does not approve the setting change request, the setting state of the ACC is not changed.

According to the present embodiment, when the apparatus determines that the setting change request is issued, the apparatus uses the notification device to notify the driver of the confirmation information (400, 500, 600, or 700) including the content of the setting change request and the information on the approval operation. When the driver performs the operation corresponding to the "information on the approval operation (402, 502, 602, or 702)" in the confirmation information, the apparatus changes the setting state of the ACC in accordance with the setting change request.

The apparatus may determine that the setting change request different from an intention of the driver is issued, due to his/her utterance being erroneously recognized. In such a case, since the content of the setting change request in the confirmation information does not match the request intended by the driver, the driver can understand that his/her utterance has been erroneously recognized. Therefore, the driver does not perform the approval operation. Since the driver does not perform the approval operation, the apparatus does not change the setting state of the ACC in accordance with the setting change request. In this manner, even if the setting change request different from the intention of the driver is issued due to the erroneous recognition for his/her utterance, it is possible to prevent the setting state of the ACC from being set erroneously.

Further, the apparatus refers to the approval operation table 300 to change the switch (any one of 51, 52, 55 and 56) of the operating device 50 to be operated when the driver performs the approval operation, in accordance with the type of the setting change request. The switch to be operated for the approval operation is set so as to correspond to the content of the setting change request. For example, when the ACC-on request is issued, the approval operation is the press operation of the main switch 51. In this way, since the switches to be operated when performing the approval operation differ from each other depending on the type of the setting change request, it is possible to confirm the intention of the driver more accurately.

The present disclosure is not limited to at least one embodiment described above, and various modification examples can be adopted within the scope of the present disclosure.

MODIFICATION EXAMPLE 1

As the switch to be operated when performing the approval operation, only a specific one of the switches 51 to 57 may be used regardless of the type of the setting change request. In one or more embodiments, the approval operation may be the press operation of the main switch 51 regardless of the type of the setting change request. In one or more embodiments, one or more switches/buttons (not shown) other than the switches 51 to 57 may be used as the switch for the approval operation.

MODIFICATION EXAMPLE 2

In one or more embodiments, the approval operation may not be required for a specific request among the above-mentioned requests. An example of such a request may be the ACC-off request. When the ACC-off request is issued, the driver often wishes to perform a driving operation (acceleration operation or deceleration operation) by himself/herself as soon as possible. In such a case, when the driver is requested to perform the approval operation, the driver may feel the operation to be troublesome. Therefore, the apparatus may change the setting state of the ACC to the cancellation state (temporary off state) without requesting the driver to perform the approval operation. Accordingly, it is possible to reduce the possibility that the driver feels troublesome. Even if the ACC-off request is issued due to the utterance of the driver being erroneously recognized, the setting state of the ACC is merely changed to the off state, and the vehicle VA is not accelerated or decelerated suddenly. Therefore, the influence on the traveling state of the vehicle VA is small.

Figure 10:
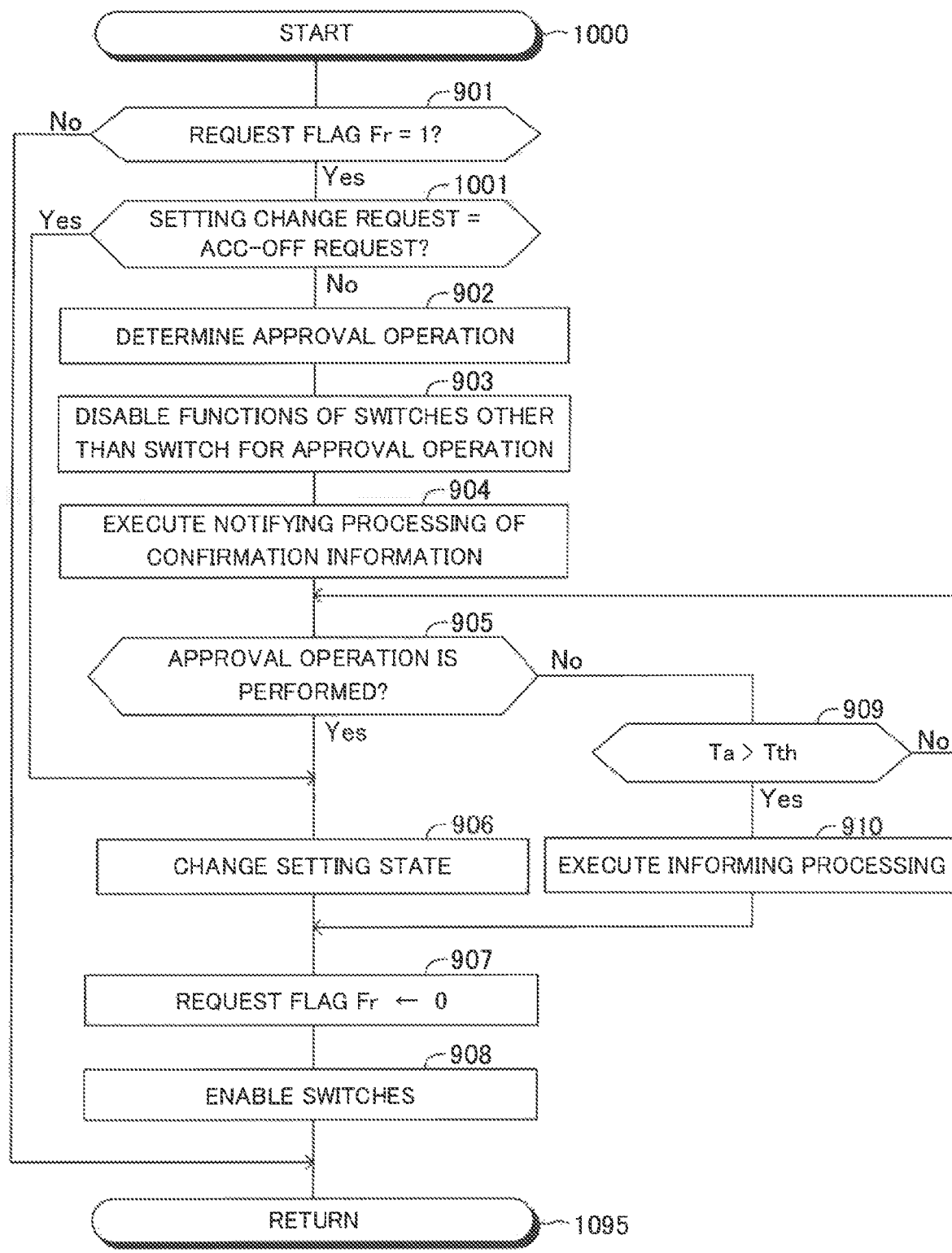
FIG. 10 is a flowchart for illustrating a "request approval routine" to be executed by the CPU of the driving support ECU according to a modification example.

The CPU 101 of the driving support ECU 10 according to this example is configured to execute a routine illustrated in FIG. 10 in place of the routine of FIG. 9. The routine of FIG. 10 is a routine in which Step 1001 is added to the routine of FIG. 9.

When the CPU starts the routine of FIG. 10 and makes a "Yes" determination in Step 901, the CPU proceeds to Step 1001. In Step 1001, the CPU determines whether the setting change request is the ACC-off request. When the setting change request is the ACC-off request, the CPU makes a "Yes" determination in Step 1001, and executes Steps 906 to 908 as described above. Thereafter, the CPU proceeds to Step 1095 to end the current execution of the present routine. In this manner, when the setting change request is the ACC-off request, the CPU changes the operating state of the ACC to the cancellation state without requesting the driver to perform the approval operation.

MODIFICATION EXAMPLE 3

The setting change request is not limited to the above example. In one or more embodiments, the setting change request may include an inter-vehicle time setting request for requesting increase or decrease of the target inter-vehicle time Ttgt which is a control parameter of the preceding-vehicle following-travel control. In this configuration, as illustrated in FIG. 11, the approval operation for the inter-vehicle time setting request may be the press operation of the inter-vehicle time setting switch 57.

In one or more embodiments, the setting change request may include one or more requests for changing a setting state of the driving support control other than the ACC. In one or more embodiments, the ECU 10 may be configured to perform the lane tracing assist control (LTA) under a situation in which the ACC is being performed. In this configuration, the setting change request may include an LTA-on request for changing an operating state of the LTA from an off state to an on state, and an LTA-off request for changing the operating state of the LTA from the on state to the off state.

MODIFICATION EXAMPLE 4

In one or more embodiments, the driving support ECU 10 may receive a plurality of setting change requests at the same time, and determine one approval operation for those setting change requests.

For example, when all of the following conditions E1 and E2 are satisfied, the driving support ECU 10 determines that the ACC-on request and a speed setting request are issued at the same time. The speed setting request is a request for setting the target speed Vset at the start of the ACC.

(Condition E1): The voice recognition result includes the word related to the ACC, the word related to the on state, and the numerical value related to the vehicle speed.

(Condition E2): The operating state of the ACC is the off state or the cancellation state at the present time.

It is assumed that the voice recognition result is "Start ACC, and set the speed to 80 km". In this case, the voice recognition result includes the word related to the ACC (="ACC"), the word related to the on state (="Start"), and the numerical value related to the vehicle speed (="80 km"). Thus, the ECU 10 determines that the condition E1 is satisfied.

As illustrated in FIG. 11, the approval operation for the ACC-on request and the speed setting request is the long press operation of the speed increasing switch 55. When the long press operation of the speed increasing switch 55 is performed, the ECU 10 changes the operating state of the ACC to the on state, and sets the target speed Vset to "80 km/h". In this example, when the plurality of setting change requests are issued, the ECU 10 determines, as the approval operation, the operation on one (the speed increasing switch 55) from among the switches 51 to 57. Therefore, the operability is improved. Since it is not necessary for the driver to operate the plurality of switches, it is possible to reduce the possibility that the driver feels the operation to be troublesome.

In one or more embodiments, two or more setting change requests may be related to one word. The ACC-on request and the LTA-on request may be related to the word "highway mode". In this configuration, the ECU 10 determines that the ACC-on request and the LTA-on request are issued at the same time when all of the following conditions F1 and F2 are satisfied.

(Condition F1): The voice recognition result includes the word "highway mode", and the word related to the on state.

(Condition F2): The operating state of the ACC is the off state or the cancellation state at the present time, and the operating state of the LTA is the off state at the present time.

It is assumed that the voice recognition result is "Start highway mode". In this case, the voice recognition result includes the word "highway mode", and the word related to the on state (="Start"). Thus, the ECU 10 determines that the condition F1 is satisfied.

As illustrated in FIG. 11, the approval operation for the ACC-on request and the LTA-on request (that is, the highway mode) is the press operation of the main switch 51. When the press operation of the main switch 51 is performed, the ECU 10 changes the operating state of the ACC to the on state, and changes the operating state of the LTA to the on state.

MODIFICATION EXAMPLE 5

In one or more embodiments, in Step 903 of the routine of FIG. 9, the CPU may maintain the function of a specific switch in an available state, in addition to the switch for the approval operation. An example of such a switch is the cancellation switch 52. When the press operation of the cancellation switch 52 is performed, the driver intends to perform the driving operation (acceleration operation or deceleration operation) by himself/herself. Therefore, the CPU may immediately switch the driving operation from the ACC to the driver.

In Step 903, the CPU may disable the respective functions of the switches other than the switch for the approval operation and the cancellation switch 52. In this case, while the CPU executes the routine of FIG. 9, the function of the cancellation switch 52 is maintained in the available state. It is assumed that the CPU determines that the request other than the ACC-off request (for example, the speed increasing request or the speed decreasing request) is issued (Step 803: Yes), and then, the driver operates the cancellation switch 52 before performing the approval operation for that request. In response to this operation, the CPU changes the operating state of the ACC to the cancellation state (temporary off state). According to this example, when the driver presses the cancellation switch 52 before Step 905 in the routine of FIG. 9, the CPU can immediately reflect the intention of the driver to change the operating state of the ACC to the off state.

What is claimed is:

1. A setting change assist apparatus for a vehicle, comprising:
    a controller configured to perform driving support control for the vehicle in accordance with a setting state of the driving support control;
    an operating device, including a plurality of operating switches, configured to be operable by a driver of the vehicle, and used for an operation changing the setting state of the driving support control; and a notification device configured to notify the driver of information,
    wherein the controller is further configured to:
        execute voice recognition processing for recognizing an utterance of the driver,
        determine whether a setting change request is issued by the utterance, the setting change request being a request for changing the setting state of the driving support control, and including a plurality of types of requests,
        when determining through the voice recognition processing that the setting change request is issued by the utterance, determine a type of the issued setting change request, determine an approval operation that defines what and how one of the operating switches is to be operated in order for the driver to perform the approval operation based on the type of the issue setting change request, and cause the notification device to notify the driver of confirmation information including both information on a content of the setting change request issued by the utterance, and information on the determined approval operation, and
        when the driver performs an operation corresponding to the information on the determined approval operation notified by the notification device by using the operating device, change the setting state of the driving support control in accordance with the setting change request
    wherein the controller is configured to perform the driving support control when an operating state as the setting state is an on state, and stop the driving support control when the operating state is an off state, the operating device comprises a first operating part to be operated for changing the operating state from the off state to the on state, and a second operating part to be operated for changing the operating state from the on state to the off state, the setting change request comprises an on request which is a request for changing the operating state from the off state to the on state, and an off request which is a request for changing the operating state from the on state to the off state, the controller is configured to:
when determining through the voice recognition processing that the on request is issued, determine an operation on the first operating part as the approval operation, and
when the operation on the first operating part is performed, change the operating state from the off state to the on state, and the controller is configured to:
when determining through the voice recognition processing that the off request is issued, determine an operation on the second operating part as the approval operation, and
when the operation on the second operating part is performed, change the operating state from the on state to the off state wherein the controller is configured to set, as the setting state, a value of a control parameter for support provided by the driving support control, and perform the driving support control in accordance with the value of the control parameter, the operating device comprises a third operating part to be operated for increasing the value of the control parameter, and a fourth operating part to be operated for decreasing the value of the control parameter, the setting change request comprises an increasing request which is a request for increasing the value of the control parameter, and a decreasing request which is a request for decreasing the value of the control parameter, the controller is configured to:
when determining through the voice recognition processing that the increasing request is issued, determine an operation on the third operating part as the approval operation, and
when the operation on the third operating part is performed, increase the value of the control parameter in accordance with the increasing request, and the controller is configured to:
when determining through the voice recognition processing that the decreasing request is issued, determine an operation on the fourth operating part as the approval operation, and
when the operation on the fourth operating part is performed, decrease the value of the control parameter in accordance with the decreasing request;

and wherein,
the driving support control is a cruise control including a constant speed travel control,
the value of the control parameter is a target speed used in the cruise control, and
the controller is further configured to:
determine that a speed increasing request as the increasing request is issued, at least when the recognized utterance of the driver includes a word related to the target speed and a numerical value related to the vehicle speed, the constant speed travel control is being performed, and the numerical value related to the vehicle speed included in the recognized utterance of the driver is higher than a speed of the vehicle at the present time, and determine that a speed decreasing request as the decreasing request is issued, at least when the recognized utterance of the driver includes a word related to the target speed and a numerical value related to the vehicle speed, the constant speed travel control is being performed, and the numerical value related to the vehicle speed included in the recognized utterance of the driver is lower than the speed of the vehicle at the present time;

wherein the controller is further configured to,
when determining through the voice recognition processing that the setting change request is issued by the utterance, the operating switches other than the operating switches that is determined to be operated in order for the driver to perform the approval operation are disabled except the second operating part, and in a case where the controller determines through the voice recognition processing that a request other than the off request is issued, when the driver performs the operation on the second operating part before performing the approval operation corresponding to the issued request, change the operating state from the on state to the off state.

2. The setting change assist apparatus according to claim 1, wherein the controller is configured to, when determining through the voice recognition processing that two or more request are issued as the setting change request, determine an operation on one of the plurality of operating parts as the approval operation.

3. The setting change assist apparatus according to claim 1, wherein the controller is configured to perform the driving support control when an operating state as the setting state is an on state, and stop the driving support control when the operating state is an off state, the operating device comprises a first operating part to be operated for changing the operating state from the off state to the on state, and a second operating part to be operated for changing the operating state from the on state to the off state, the setting change request comprises an on request which is a request for changing the operating state from the off state to the on state, and an off request which is a request for changing the operating state from the on state to the off state, the controller is configured to:
when determining through the voice recognition processing that the on request is issued, determine an operation on the first operating part as the approval operation, and
when the operation on to the first operating part is performed, change the operating state from the off state to the on state, and the controller is configured to:
when determining through the voice recognition processing that the off request is issued, change the operating state from the on state to the off state without requesting the driver to perform the approval operation.

* * * * *